United States Patent
Mizumoto et al.

(10) Patent No.: US 8,451,564 B2
(45) Date of Patent: May 28, 2013

(54) IMPACT ENERGY DISPERSING CRASH STOP FOR A HARD DISK DRIVE

(75) Inventors: Naoshi Mizumoto, Kanagawa (JP); Takeshi Chawanya, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 199 days.

(21) Appl. No.: 12/979,257

(22) Filed: Dec. 27, 2010

(65) Prior Publication Data

US 2012/0162812 A1 Jun. 28, 2012

(51) Int. Cl.
*G11B 5/54* (2006.01)

(52) U.S. Cl.
USPC .................................................. 360/265.1

(58) Field of Classification Search
USPC .................................................... 360/265.1
See application file for complete search history.

(56) References Cited

U.S. PATENT DOCUMENTS

| | | | |
|---|---|---|---|
| 4,949,206 A | 8/1990 | Phillips et al. | |
| 5,134,608 A | 7/1992 | Strickler et al. | |
| 5,262,913 A | 11/1993 | Stram et al. | |
| 5,455,726 A * | 10/1995 | Liu | 360/265.1 |
| 5,715,119 A * | 2/1998 | Williams et al. | 360/265.1 |
| 5,973,888 A * | 10/1999 | Chawanya et al. | 360/265.1 |
| 6,125,017 A * | 9/2000 | Misso et al. | 360/265.1 |
| 6,567,242 B2 * | 5/2003 | Misso et al. | 360/265.1 |
| 6,628,482 B2 | 9/2003 | Hong et al. | |
| 7,038,887 B2 | 5/2006 | Ooi et al. | |

FOREIGN PATENT DOCUMENTS

| | | |
|---|---|---|
| JP | 10-241305 | 9/1998 |
| JP | 2007-188550 | 7/2007 |

* cited by examiner

*Primary Examiner* — Brian Miller

(57) ABSTRACT

A hard disk drive including a crash stop is disclosed. The crash stop includes a shaft and a resilient member covering a portion of the shaft. In addition, the resilient member includes a right side protrusion and a left side protrusion. The right and left side protrusions are configured to disperse energy from an impact between a head stack assembly and the crash stop.

5 Claims, 5 Drawing Sheets

600

```
┌─────────────────────────────────────────────────────────────┐
│  Receives a contact event between the crash stop and the head stack │
│                          assembly.                          │
│                            610                              │
└─────────────────────────────────────────────────────────────┘
                              │
                              ▼
┌─────────────────────────────────────────────────────────────┐
│ Rotates the crash stop so that a first protrusion of the crash stop comes into │
│    contact with a portion of the HDD, the first protrusion undergoing a        │
│  deformation during contact such that some of the energy from the impact       │
│  between the crash stop and the head stack assembly is absorbed by the first   │
│                          protrusion.                        │
│                            620                              │
└─────────────────────────────────────────────────────────────┘
                              │
                              ▼
┌─────────────────────────────────────────────────────────────┐
│  Utilizes the repelling force of the first protrusion to rotate the crash stop in │
│   the opposite direction thereby dispersing the energy absorbed by the first    │
│                          protrusion.                        │
│                            630                              │
└─────────────────────────────────────────────────────────────┘
```

FIG. 6

IMPACT ENERGY DISPERSING CRASH STOP FOR A HARD DISK DRIVE

BACKGROUND

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model uses a read/write head to read and write information or data on a magnetic disk. In some operations, as the magnetic disk spins, the read/write head follows a track or path along the surface of the magnetic disk. In HDD manufacture and operation, it is important to protect the actuator arm from inadvertently contacting other components within the HDD. For example, the actuator arm may be moved into contact with another component within the HDD. The reasons may include external shock, vibration loads and the like.

Moreover, as the components of the HDD are reduced in size, the distance between the actuator arm and other components of the HDD is also reduced. In other words, while a first larger HDD may have a tolerable amount of spacing, as the components are moved closer together, the probable impact between an actuator arm and another portion of the HDD is also more likely.

SUMMARY

A hard disk drive including a crash stop is disclosed. The crash stop includes a shaft and a resilient member covering a portion of the shaft. In addition, the resilient member includes a right side protrusion and a left side protrusion. The right and left side protrusions are configured to disperse energy from an impact between a head stack assembly and the crash stop.

BRIEF DESCRIPTION OF THE DRAWINGS

FIG. 6 is a flow chart of a method for reducing detrimental results from a head stack assembly utilizing a crash stop in accordance with an embodiment of the present invention.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
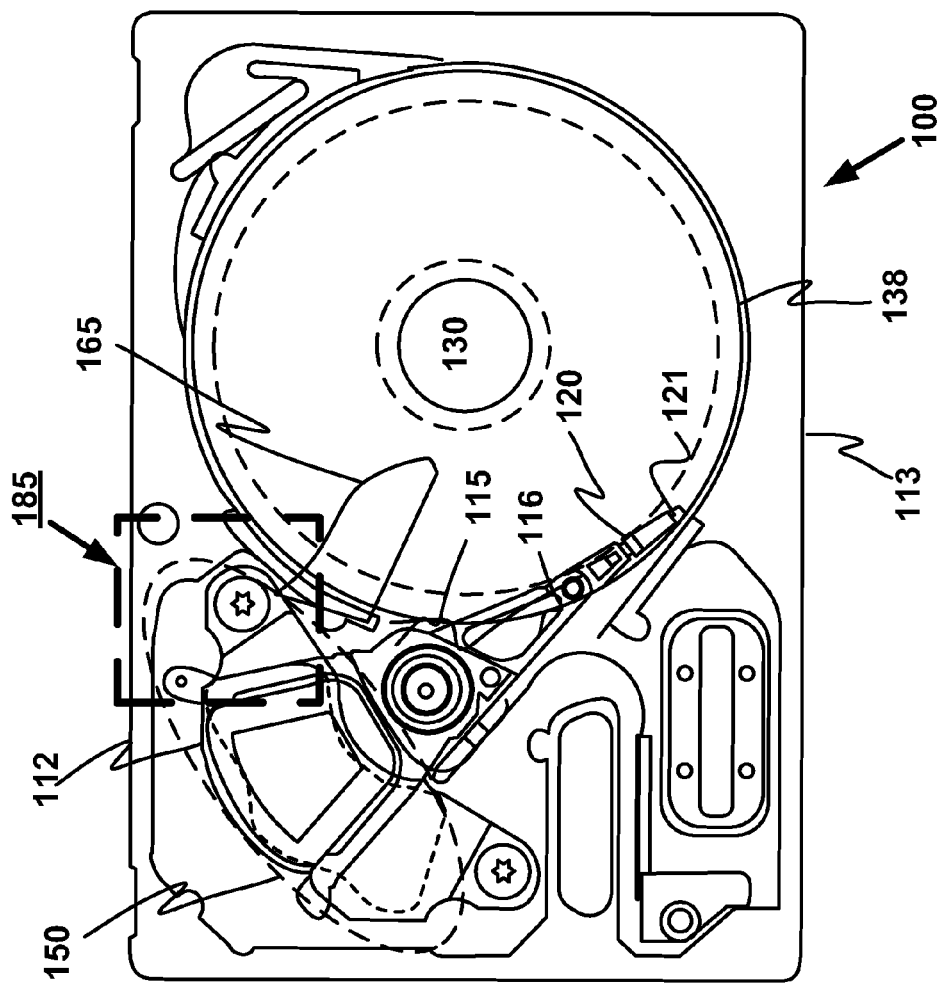
FIG. 1 is an isometric view of a hard disk drive in accordance with an embodiment of the present invention.

With reference now to FIG. 1, an isometric view of one embodiment of an information storage system including a magnetic hard disk file or HDD 100 for a computer system is shown. Although only one head and one disk surface combination are shown, embodiments described herein for one head-disk combination may also be applicable to multiple head-disk combinations.

In general, HDD 100 has an internal base plate 113 and an internal cover (not shown). In one embodiment, internal housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the circumferential direction relative to internal base plate 113. A head stack assembly (HSA) 115 includes one or more actuator arms 116. When a number of actuator arms 116 are present, they are usually represented in the form of a comb that is movably or pivotally mounted to base/housing 113. A controller 150 is also mounted to internal base plate 113 for selectively moving the actuator arms 116 relative to the disk 138. HSA 115 may be coupled with a connector assembly, such as a flex cable to convey data between arm electronics (AE) and a host system, such as a computer, wherein HDD 100 resides.

In one embodiment, each actuator arm 116 has extending from it at least one cantilevered integrated lead suspension (ILS) 120. The ILS 120 may be any form of lead suspension that can be used in a data access storage device. The level of integration containing the slider or magnetic head 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the HSA 115 by controller 150 causes the head gimbal assembly to move along radial arcs across tracks on the surface of disk 138. FIG. 1 also includes a crash stop 285 and a spoiler 165.

Figure 2:
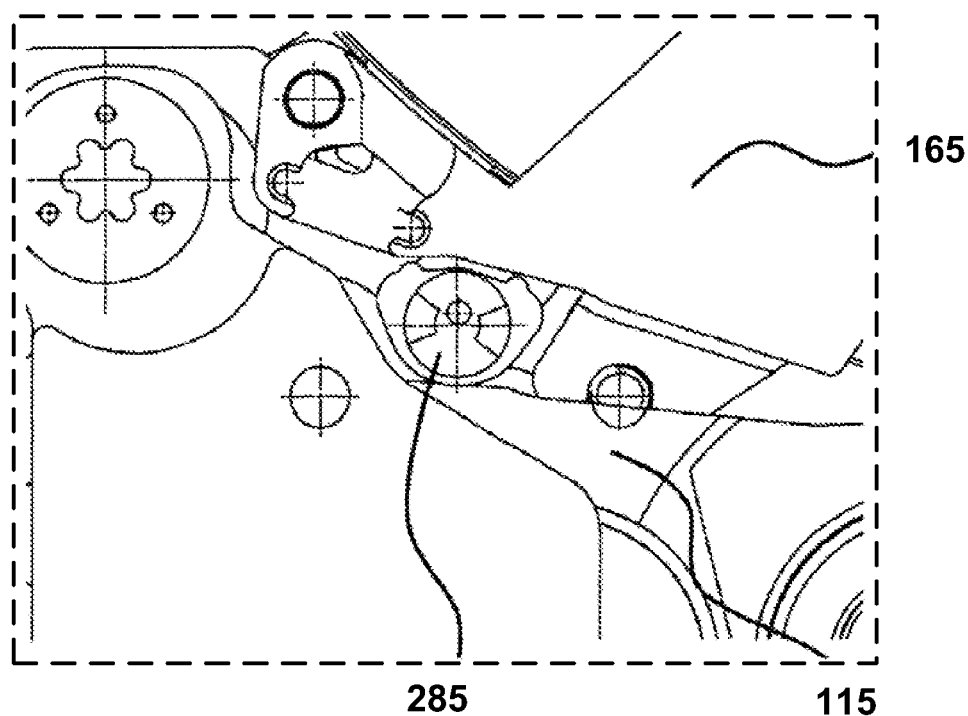
FIG. 2 is an isometric view of a blown-up portion of FIG. 1 including the crash stop in accordance with an embodiment of the present invention.

With reference now to FIG. 2 an isometric view of a blown-up portion 185 of FIG. 1 including crash stop 285 is shown in accordance with one embodiment. In FIG. 2, crash stop 285 is disposed between spoiler 165 and HSA 115. Furthermore, crash stop 285 is rotatably inserted into a hole provided in base 113. Although crash stop 285 is in contact with HSA 115, it is placed a fixed distance from spoiler 165 such that there is no contact between crash stop 285 and spoiler 165.

Figure 3A:
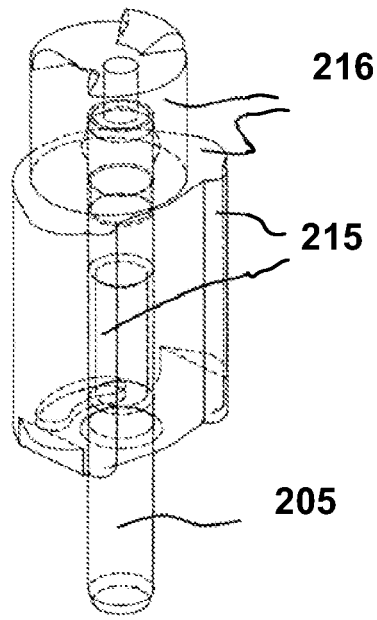
FIG. 3A is an oblique isometric view of a crash stop in accordance with an embodiment of the present invention.

With reference now to FIG. 3A an oblique isometric view of crash stop 285 is shown in accordance with an embodiment of the present invention. In one embodiment, crash stop 285 of FIG. 3A includes shaft 205, resilient member 216 and two protrusions 215. In one embodiment, resilient member 216 covers the side surface of shaft 205. In general, crash stop 285 can absorb impacts from HSA 115 while reducing the transmission of the energy of such impacts to other component within the HDD, such as for example, spoiler 165.

Figure 3B:
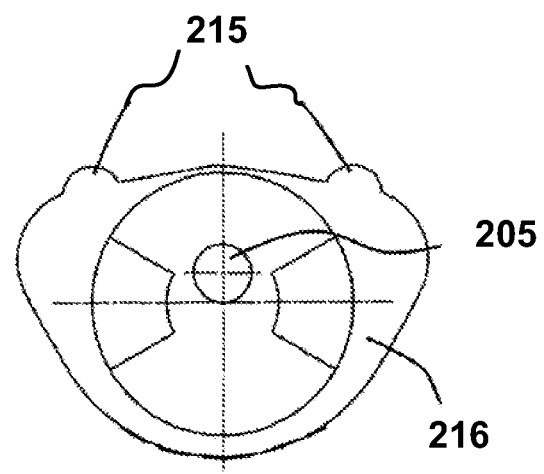
FIG. 3B is a top isometric view of a crash stop in accordance with an embodiment of the present invention.

FIG. 3B is a top isometric view of crash stop 285 in accordance with one embodiment. As shown in FIG. 3B of crash stop 285 the cross section of resilient member 216 cut substantially perpendicular to the direction of shaft 205 is shaped like an isosceles triangle having three rounded corners. In one embodiment, two protrusions 215 are provided at approximately each end of the longest side of said isosceles triangle. Each of the two protrusions 215 is substantially semicircular in shape. In addition, these two protrusions 215 are provided substantially symmetrically with respect to either side of the center line of resilient member 216.

Although part of resilient member 216 is shaped substantially like an isosceles triangle in FIG. 3B, a substantially triangular shape may also be used in accordance with one embodiment. Furthermore, in one embodiment the two protrusions 215 may be semielliptical in shape.

Figure 4:
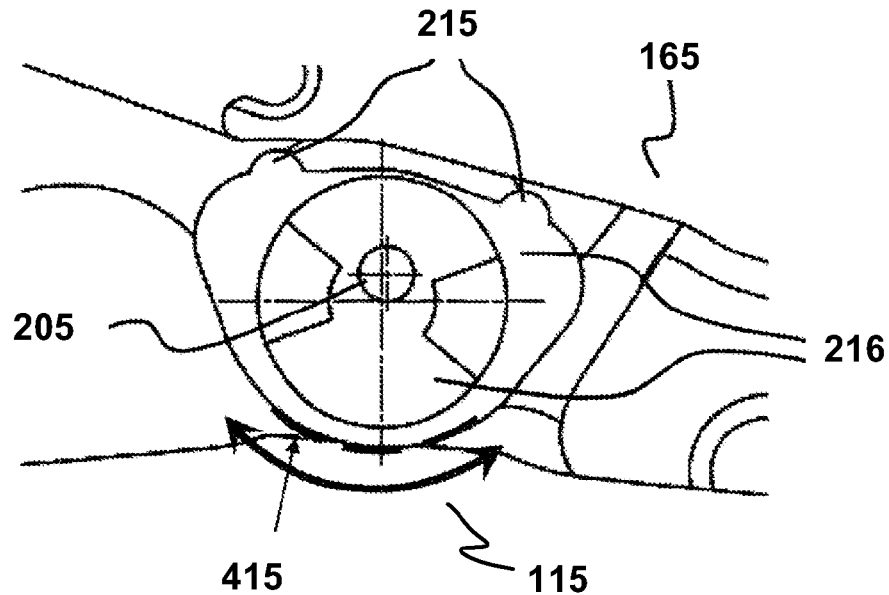
FIG. 4 is an isometric view of the relationship between a crash stop, a spoiler and a head stack assembly in accordance with an embodiment of the present invention.

FIG. 4 is an isometric view of the relationship between crash stop 285, spoiler 165 and HSA 115 in accordance with an embodiment. Moreover, FIG. 4 is an enlarged view of FIG. 2 to provide further detail of the relationship between crash stop 285, spoiler 165 and HSA 115. In one embodiment, crash stop 285 is oriented such that the side of crash stop 285 that includes protrusions 215 is opposite to spoiler 165. In one embodiment, crash stop 285 is configured such that, at a certain angle of rotation, one of the two protrusions 215 comes into contact with spoiler 165. Thus, in one embodiment crash stop 285 is not designed to rotate in a complete 360 while mounted inside HDD 100.

In one embodiment, part of crash stop 285 is surface-treated portion 415. For example, crash stop 285 includes surface-treated portion 415 in the area which may come into contact with the HSA 115 due to the rotation of the crash stop. In one embodiment, since only a portion of the crash stop includes surface-treated portion 415 production costs can be reduced. In one embodiment, the surface treatment is utilized to reduce the possibility that crash stop 285 would adhere with HSA 115 when contact is made.

Figure 5:
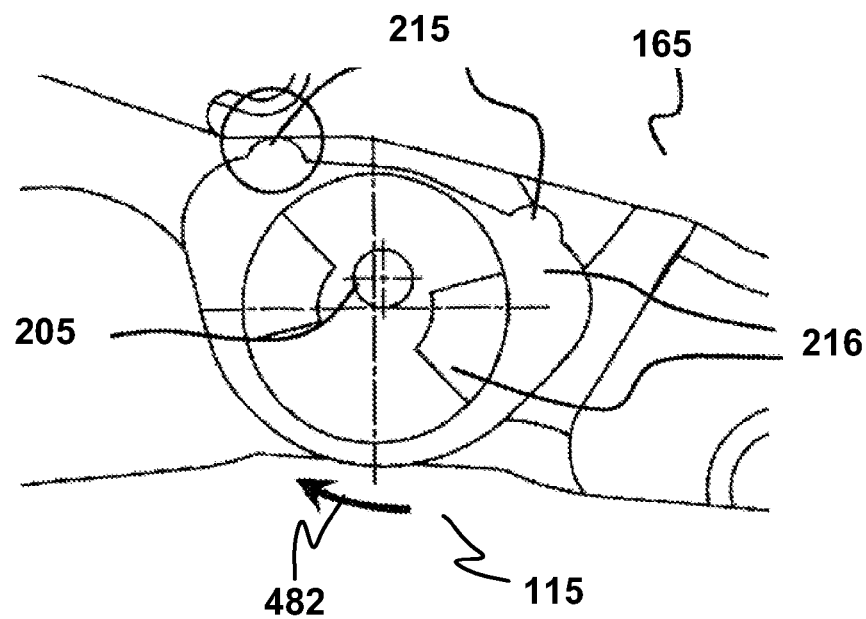
FIG. 5 is an isometric view of a crash operation including a crash stop, a spoiler and a head stack assembly in accordance with an embodiment of the present invention.

With reference now to FIG. 5 is an isometric view of a crash operation including crash stop 285, spoiler 165 and HSA 115 in accordance with one embodiment.

FIG. 6 is a flowchart of a method for reducing detrimental results from a head stack assembly collision with a crash stop in accordance with one embodiment. The following example utilizes the flowchart of FIG. 6 in conjunction with FIG. 5 to illustrate one embodiment of the dispersal of energy for a HDD 100 in which HSA 115 has impacted crash stop 285.

With reference now to 610 of FIG. 6 and to FIG. 5, one embodiment receives a contact event between crash stop 285 and HSA 115.

With reference now to 620 of FIG. 6 and to FIG. 5, one embodiment, rotates crash stop 285 in the direction of arrow 482 so that the left-hand protrusion 215 of crash stop 285 comes into contact with spoiler 165. In one embodiment, the left-hand protrusion 215 undergoes deformation when contacting spoiler 165 such that some of the impact energy from the impact between crash stop 285 and HSA 115 is absorbed by the left-hand protrusion 215.

With reference now to 630 of FIG. 6 and to FIG. 5, one embodiment utilizes the repelling force of the left-hand protrusion 215 to move crash stop 285 in the direction opposite to arrow 482. In other words, as crash stop 285 attempts to return to its original state the previously absorbed crash energy is dispersed.

If the energy of the crash is strong enough, crash stop 285 may rotate far enough such that right-hand protrusion 215 may come into contact with spoiler 165. The right-hand protrusion 215 which may come into contact with spoiler 165 may also undergo deformation. Again, some of the impact energy from the impact of HSA 115 with crash stop 285 is absorbed by right-hand protrusion 215. Moreover, the repelling force of right-hand protrusion 215 may cause crash stop 285 to move in the direction of arrow 482 as crash stop 285 attempts to return to its original state.

By repeating this process as many times as needed, the energy resulting from HSA 115 impacting crash stop 285 can be dispersed by the left and right protrusions 215 of crash stop 285 instead of being transmitted to spoiler 165. Thus, one embodiment described herein provides crash stop 285 which can absorb impacts from HSA 115 while reducing the transmission of the energy of such impacts to other component within the HDD 100.

Various embodiments of the present invention are thus described. While the present invention has been described in particular embodiments, it should be appreciated that the present invention should not be construed as limited by such embodiments, but rather construed according to the following claims.

What is claimed is:

1. A method for dispersing energy from an impact between a head stack assembly and a crash stop within a HDD, the method comprising:
    receiving a contact event between the crash stop and the head stack assembly;
    rotating the crash stop so that a first protrusion of the crash stop comes into contact with a portion of the HDD, the first protrusion undergoing a deformation during contact such that some of the energy from the impact between the crash stop and the head stack assembly is absorbed by said first protrusion;
    utilizing a repelling force of the first protrusion to rotate the crash stop in an opposite direction thereby dispersing the energy absorbed by said first protrusion;
    rotating the crash stop so that a second protrusion of the crash stop comes into contact with a portion of the HDD, the second protrusion undergoing a deformation during contact such that some of the energy from the impact between the crash stop and the head stack assembly is absorbed by said second protrusion; and
    utilizing a repelling force of the second protrusion to rotate the crash stop in the opposite direction and disperse the energy absorbed by said second protrusion.

2. The method of claim 1 wherein the first protrusion of the crash stop comes into contact with a spoiler.

3. The method of claim 1 wherein the second protrusion of the crash stop comes into contact with a spoiler.

4. The method of claim 1 further comprising:
    repeating the rotating of the crash stop so that a first protrusion of the crash stop comes into contact with a portion of the HDD and the rotating of the crash stop so that the second protrusion of the crash stop comes into contact with a portion of the HDD until the energy resulting from the head stack assembly impacting the crash stop is dispersed.

5. The method of claim 1 further comprising:
limiting the rotation of the crash stop mounted in the HDD to less than 360 degrees.

* * * * *